US008960031B2

(12) United States Patent
Keech et al.

(10) Patent No.: US 8,960,031 B2
(45) Date of Patent: Feb. 24, 2015

(54) AIRCRAFT STABILIZER ACTUATOR

(75) Inventors: Nancy Kay Keech, Long Beach, CA (US); Luc P. Cyrot, Mission Viejo, CA (US); Eric A. Polcuch, Mission Viejo, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 403 days.

(21) Appl. No.: 12/873,996

(22) Filed: Sep. 1, 2010

(65) Prior Publication Data

US 2011/0048147 A1  Mar. 3, 2011

Related U.S. Application Data

(60) Provisional application No. 61/238,710, filed on Sep. 1, 2009.

(51) Int. Cl.
| | | |
|---|---|---|
| *F16H 1/20* | (2006.01) | |
| *B64C 13/28* | (2006.01) | |
| *B64C 5/02* | (2006.01) | |
| *F16H 25/20* | (2006.01) | |

(52) U.S. Cl.
CPC . *B64C 13/28* (2013.01); *B64C 5/02* (2013.01); *F16H 25/205* (2013.01)
USPC .......................................... 74/89.26; 244/99.3

(58) Field of Classification Search
USPC .......................................... 74/89.26; 244/99.3
See application file for complete search history.

(56) References Cited

U.S. PATENT DOCUMENTS

| | | | | |
|---|---|---|---|---|
| 2,809,736 A | * | 10/1957 | Hoover | 192/143 |
| 3,003,470 A | * | 10/1961 | Geyer | 92/17 |
| 3,766,790 A | * | 10/1973 | Weir | 74/89.26 |
| 4,637,272 A | * | 1/1987 | Teske et al. | 74/89.26 |
| 4,714,006 A | * | 12/1987 | Tootle et al. | 92/5 R |
| 4,841,844 A | * | 6/1989 | Tootle | 92/5 R |
| 5,214,972 A | * | 6/1993 | Larson et al. | 74/89.26 |
| 5,448,884 A | * | 9/1995 | Repp | 60/223 |
| 5,918,505 A | * | 7/1999 | Jensen | 74/89.26 |
| 6,334,276 B1 | * | 1/2002 | Marin-Martinod et al. | 49/139 |
| 6,494,033 B1 | * | 12/2002 | Davies | 60/226.2 |
| 6,672,540 B1 | * | 1/2004 | Shaheen et al. | 244/99.3 |
| 6,928,895 B2 | * | 8/2005 | Davies et al. | 74/89.26 |
| 6,981,428 B2 | * | 1/2006 | Donald et al. | 74/89.26 |
| 7,231,842 B2 | * | 6/2007 | Biester et al. | 74/89.25 |
| 7,584,678 B2 | * | 9/2009 | Murao | 74/89.23 |

(Continued)

*Primary Examiner* — David M Fenstermacher
*Assistant Examiner* — Zakaria Elahmadi
(74) *Attorney, Agent, or Firm* — Renner, Otto, Boisselle & Sklar, LLP (57) ABSTRACT

An actuator for actuating movement of a control surface relative to a structure can include a high-efficiency assembly and a low-efficiency assembly. The high-efficiency assembly can be connectable between a control surface and a structure for providing a first load transfer assembly and the assembly can have minimum backlash. The low-efficiency assembly is connectable between the control surface and the structure for providing a second load transfer assembly. The low-efficiency or irreversible assembly can be disposed in parallel relationship to the high-efficiency assembly and can have a higher backlash than the low-efficiency assembly. The low-efficiency assembly can be unloaded in normal operation. The actuator also can include a coupler for that can have a closed state in which both load transfer assemblies are synchronously driven by the drive mechanism, and an open state in which the drive mechanism is decoupled from the low-efficiency assembly and the low-efficiency assembly can inhibit movement of the control surface.

26 Claims, 7 Drawing Sheets

(56) References Cited

U.S. PATENT DOCUMENTS

| | | | |
|---|---|---|---|
| 7,610,828 B2 * | 11/2009 | Wingett et al. | 74/424.78 |
| 7,669,493 B2 * | 3/2010 | Hoth et al. | 74/89.26 |
| 7,802,488 B2 * | 9/2010 | Bucheton et al. | 74/89.23 |
| 8,266,976 B2 * | 9/2012 | Waide | 74/89.26 |
| 8,281,678 B2 * | 10/2012 | Cavalier et al. | 74/89.23 |
| 8,291,782 B1 * | 10/2012 | Shaheen et al. | 74/89.26 |
| 2002/0104394 A1 * | 8/2002 | Manzanares et al. | 74/89.26 |
| 2006/0016281 A1 * | 1/2006 | Donald et al. | 74/89.26 |
| 2008/0203223 A1 * | 8/2008 | Cyrot et al. | 244/99.3 |
| 2009/0260462 A1 * | 10/2009 | Liegeois et al. | 74/89.26 |
| 2010/0024580 A1 * | 2/2010 | Hadley et al. | 74/89.26 |

\* cited by examiner

AIRCRAFT STABILIZER ACTUATOR

RELATED APPLICATIONS

This application claims the benefit of U.S. Provisional Application No. 61/238,710 filed Sep. 1, 2009, which is hereby incorporated herein by reference.

BACKGROUND OF THE INVENTION

In a large majority of commercial aircrafts, the position of the horizontal stabilizer is controlled by a single ball screw actuator with two load paths for safety, for example, a tie-rod within a ball screw and two nuts on the screw. The screw, tie-rod and both nuts have independent attachments to the stabilizer that provide first and second load paths which preclude a catastrophic loss of holding capability with a single structural failure. This is a key requirement for the FAA certification of any commercial aircraft. The second load path may only be used to control the stabilizer upon a failure of the first load path.

This type of architecture requires periodic manual inspection of the second load path to verify its integrity and to identify potential latent failures. Furthermore, this architecture still has the potential for a single failure mechanism in the complete loss of the ball screw threads, which would result in a loss of control of both nuts and a catastrophic loss of control of the stabilizer.

SUMMARY OF THE INVENTION

The present invention provides an actuator that can eliminate a potential single failure mechanism of the ball screw thread found in certain previous designs. The actuator has an architecture that can improve the reliability of the system by reducing the latencies of a structural failure and/or the need for manual periodic inspections of the load transfer assemblies between the airframe and the control surface.

An actuator according to one aspect of the invention includes a primary load transfer assembly disposed in a parallel relationship with a secondary load transfer assembly. Each load transfer assembly can have separate connections to the airframe and the control surface whereby no single failure will result in a loss of holding capability. The actuator can include a motor coupled to the primary load transfer assembly and secondary load transfer assembly by a coupler, which can be controlled to engage/disengage the motor from the secondary load transfer assembly. For example, the coupler may be an electric, hydraulic, or mechanical coupler that can be controlled to operate in a closed state and an open state.

Under normal operating conditions, the coupler engages the drive mechanism to the primary load transfer assembly and the secondary load transfer assembly. The primary load transfer assembly carries the load from the motor to the control surface with the secondary load transfer assembly being generally unloaded. Upon detection of a failure, the coupler can disengage the drive mechanism from the secondary load transfer assembly. The secondary load transfer assembly, which can include a low-efficiency assembly, can therefore be loaded upon failure of the first load transfer assembly. When loaded, the second load transfer assembly, via the low-efficiency assembly, can inhibit movement of the control surface, which may avoid a catastrophic loss of control of the control surface during flight.

The coupler can allow the integrity of the primary load transfer assembly and the secondary load transfer assembly to be tested, for example, prior to each flight or as otherwise needed. For example, from the cockpit of the aircraft, maintenance personnel can test the primary and secondary load transfer assemblies by commanding the coupler open and driving the motor to determine if the control surface moves. The coupler thereby can provide a means to test the integrity of the primary and secondary load transfer assemblies without a physical inspection of the actuator and/or load transfer assemblies.

Additionally, measurement of the range of movement of the control surface while the coupler is in the open state can provide a measurement of the overall backlash and wear of the actuator, which can be beneficial in the determination of when parts may need to be repaired and/or replaced.

According to a particular embodiment, an actuator for actuating movement of a control surface relative to a structure can include a first load transfer assembly and a second load transfer assembly. The first load transfer assembly can include a high-efficiency assembly and can be connectable between a control surface and a structure for providing a first load path (also referred to as a "primary load path") between the control surface and the structure. The second load transfer assembly can be disposed in parallel relationship to first load transfer assembly and can include an irreversible or non-backdrivable assembly (also referred to as a "low-efficiency assembly"). The second load transfer assembly can be connectable between the control surface and the structure for providing a second load path ("also referred to as a "secondary load path") between the control surface and the structure. The actuator includes a drive mechanism for driving the high-efficiency assembly and a coupler having a closed state and an open state. In the closed state, the drive mechanism is coupled to both the high-efficiency assembly and the low-efficiency assembly such that both assemblies are synchronously driven. In the open state, the drive mechanism is decoupled from the low-efficiency assembly so that low-efficiency assembly can inhibit movement of the control surface (e.g., via a non-backdrivable assembly or another low-efficiency arrangement).

The primary load transfer assembly can include a ball screw and a nut and the secondary load transfer assembly can include an Acme screw. The Acme screw may be inverted and concentric with (e.g., surrounding) the ball screw and nut, or laterally offset and parallel to the ball screw and nut.

According to another aspect of the invention, a method of using the actuator can include driving the drive mechanism with the coupler in the closed state to synchronously drive the high-efficiency assembly and the low-efficiency assembly and determining when a failure condition exists in the first load transfer assembly. The method further includes opening the coupler upon detection of a failure condition to thereby decouple the high-efficiency assembly from the drive mechanism, and inhibiting movement of the control surface with the low-efficiency assembly.

According to another aspect of the invention, a method for testing the actuator includes driving the drive mechanism when the coupler is in the open state to drive the high-efficiency assembly, and determining if the low-efficiency assembly inhibits movement of the high-efficiency assembly, whereby the inhibition of movement by the low-efficiency assembly with the coupler in the open state indicates the integrity of both the high-efficiency assembly and the low-efficiency assembly and respective load paths, as well as the mounts on the airframe and the control surface.

According to another aspect of the invention, the total backlash of both load transfer assemblies can be determined by decoupling the low-efficiency assembly by opening the coupler and driving the high-efficiency assembly in a first direction. The low-efficiency assembly can inhibit movement of the high-efficiency assembly in the first direction and cause the drive mechanism to stall at a first stall position. The high-efficiency assembly can then be driven in a second direction, whereby the low-efficiency assembly can inhibit movement of the high-efficiency assembly in the second direction, and can cause the drive mechanism to stall at a second stall position. The sum of the backlashes of the two assemblies can be determined by comparing the first stall position and the second stall position. In one embodiment, the high-efficiency assembly backlash is minimized while the low-efficiency assembly is maximized. As a result the low-efficiency assembly is unloaded in normal operation.

The following description and annexed drawings set forth in detail certain illustrative embodiments, these embodiments being indicative of but a few of the various ways in which the principles may be employed.

DETAILED DESCRIPTION

Figure 1:
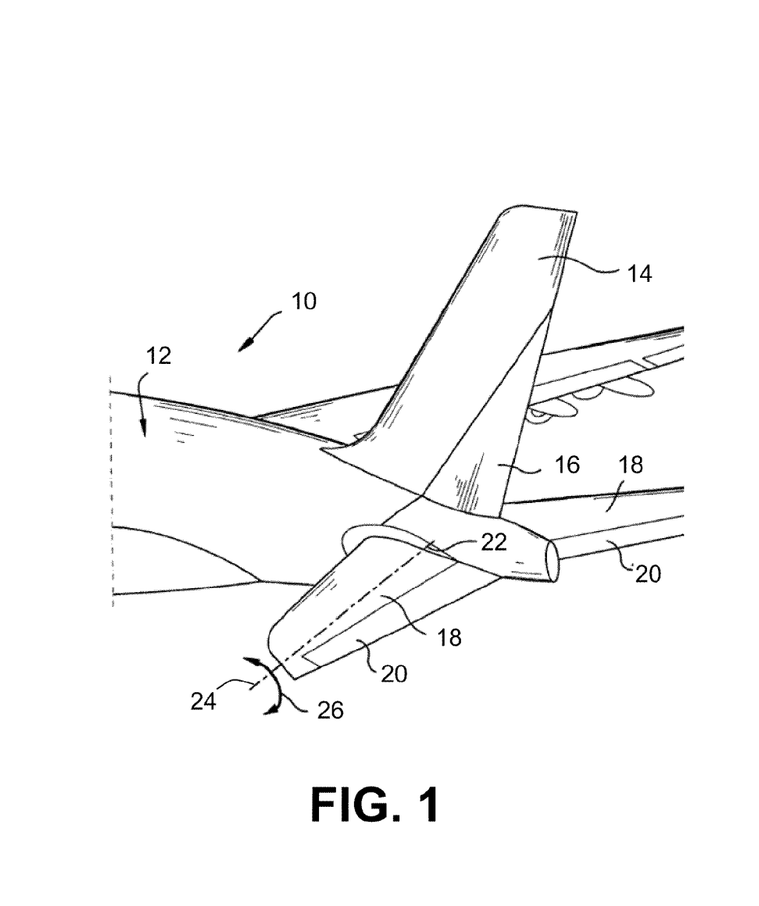
FIG. 1 is a simplified perspective view of the tail portion of an aircraft with a pivotably movable horizontal stabilizer.

Referring initially to FIG. 1, an aircraft 10 can include a tail portion 12 having a tail fin 14 which carries control surfaces, such as a rudder 16. The horizontal stabilizer 18 is movable and carries control surfaces such as elevators 20. The horizontal stabilizer 18 can be pivotally mounted to the fuselage at pivot point 22 whereby it can be pivoted about axis 24 to adjust the longitudinal pitch (i.e., "trim") of the aircraft 10 as indicated by arrows 26. During flight, the horizontal stabilizer can be adjusted by an actuator which, in the illustrated embodiment, moves the leading edge of the stabilizer upward/downward relative to the axis 24. The stabilizer adjustments may be automatically controlled directly from the aircraft's flight computers and/or may be manually controlled by pilot input.

Figure 2:
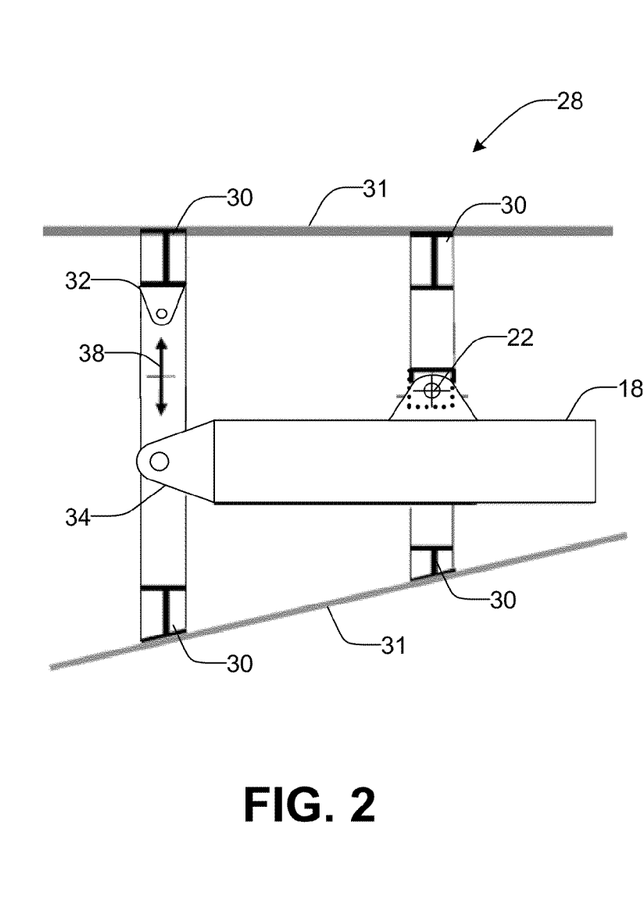
FIG. 2 is a schematic illustration showing an exemplary horizontal stabilizer and surrounding aircraft structure with mounts for an actuator that can be extended and retracted to effect pivotal movement of the stabilizer.

With additional reference to FIG. 2, a portion of the airframe 28 of the tail portion 12 of the aircraft 10 is shown. The airframe 28 can include a plurality of supporting ribs 30 that support the outer body 31 of the aircraft 10. The airframe 28 can have a connecting portion 32 for connection to an actuator for controlling the position of the control surface (e.g., the horizontal stabilizer 18). Likewise, the horizontal stabilizer 18 also can have a connecting portion 34 for connection to the actuator. Suitable mechanisms for connecting the actuator to the airframe and the stabilizer may include, for example, gimbals, a U-joint, rod ends with spherical bearings, etc.

As indicated generally by arrows 38 in FIG. 2, movement of an actuator connected to the airframe 28 and horizontal stabilizer 18 between the extended and retracted positions may cause corresponding movement of the connecting portion 34 on the stabilizer 18 relative to the connecting portion 32 on the airframe 28. This movement may cause the stabilizer 18 to pivot about point 22 along axis 24.

Figure 3:
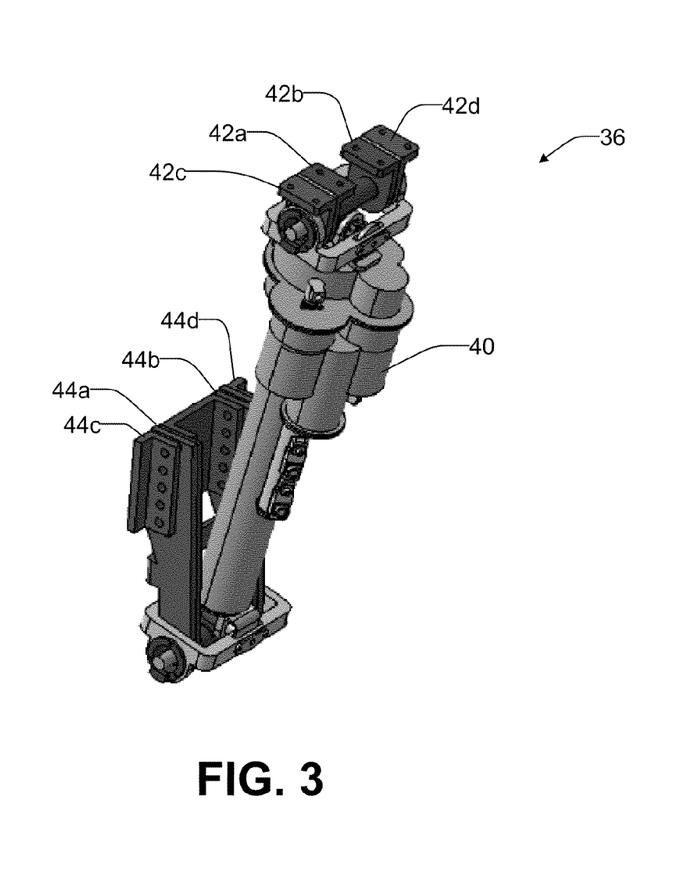
FIG. 3 is a perspective view of an exemplary actuator in a retracted position.
Figure 4:
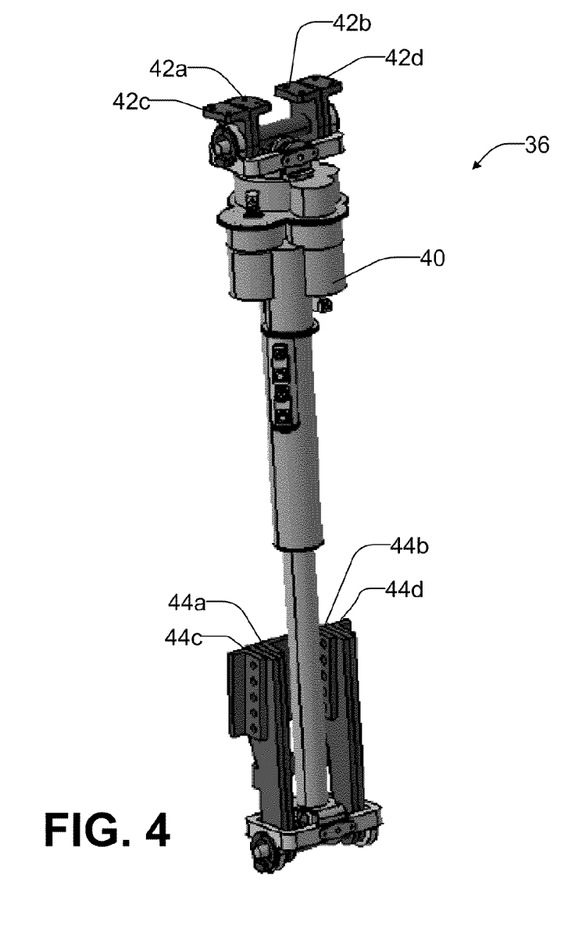
FIG. 4 is a perspective view of the actuator of FIG. 3 in an extended position.

Referring now to FIGS. 3 and 4, an exemplary embodiment of an actuator 36 and associated hardware for mounting the actuator to the airframe and horizontal stabilizer is shown. The actuator 36 can be movable over a range of motion from a fully retracted position (FIG. 3) to a fully extended position (FIG. 4). The actuator 36 can include includes a housing 40 that contains motors, gears, etc., and provides a protective outer casing for the drive assemblies contained therein.

The actuator 36 can include mounting brackets for mounting the actuator to the airframe and stabilizer. In the illustrated embodiment, the actuator 36 includes dualized mounting brackets 42a, 42b, 42c and 42d for mounting the actuator 36 to the rib 30 of the airframe 28 and dualized mounting brackets 44a, 44b, 44c and 44d for mounting the actuator 36 to the stabilizer 18. The inner mounting brackets 42a and 42b and 44a and 44b can be attached to a high-efficiency assembly, and outer mounting brackets 42c & 42d and 44c & 44d can be attached to a low-efficiency assembly. The details of the actuator 36 including the high and low-efficiency assemblies are provided below with respect to the schematic illustrations of FIGS. 5-7, and illustration of an implementation of the drive assemblies in the actuator shown in FIGS. 8-12.

Figure 5:
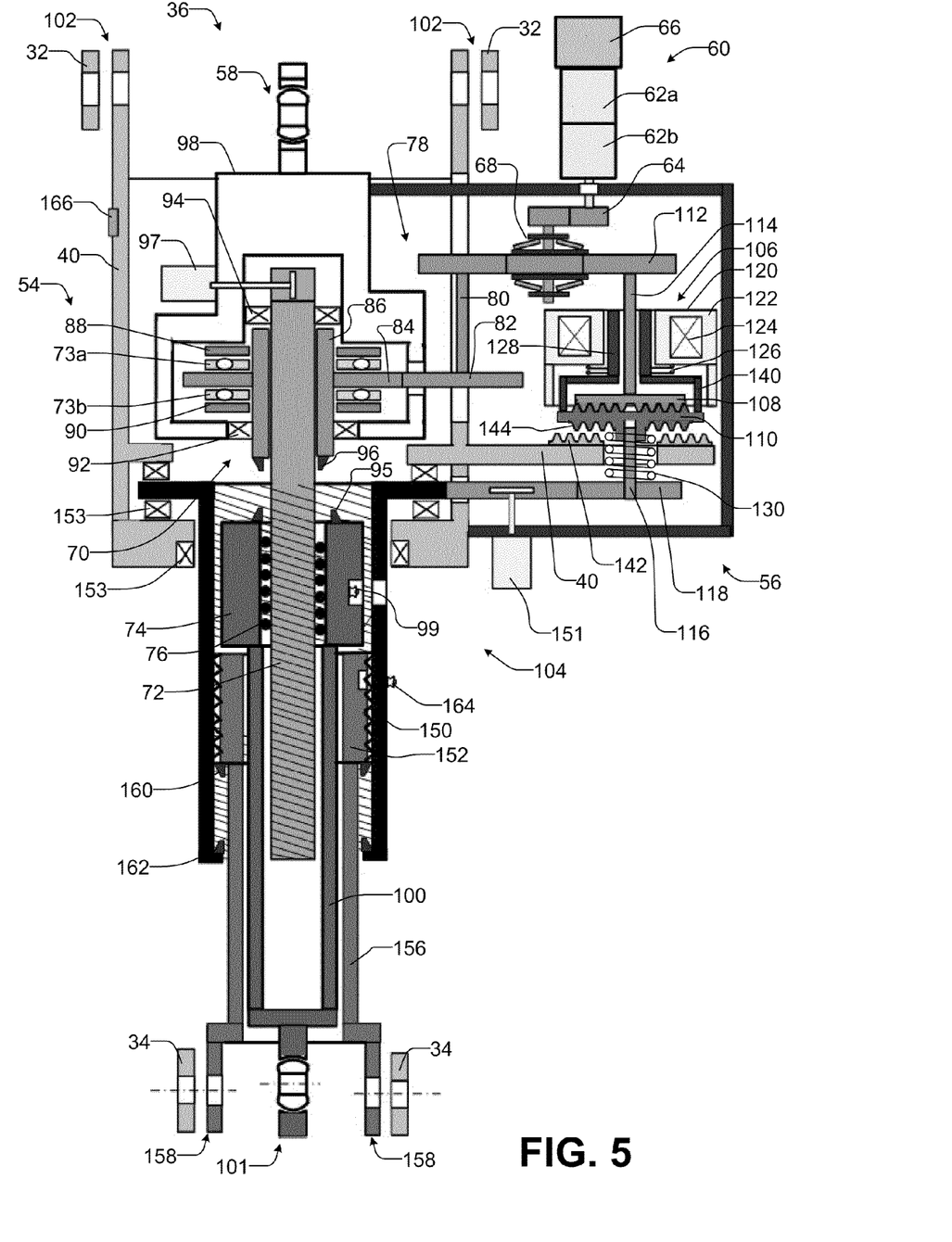
FIG. 5 is a schematic illustration of the actuator.

Referring initially to FIG. 5, and generally to FIGS. 8-12, a schematic illustration of the actuator 36 is shown. The housing 40 of the actuator 36 at least partially contain a first load transfer assembly 54 (also referred to as a "primary load transfer assembly") and a second load transfer assembly 56 (also referred to as a "secondary load transfer assembly"). The primary load transfer assembly 54 can be connectable between the stabilizer 18 and the airframe 26 to provide a primary load path between the stabilizer 18 and the airframe 26. The secondary load transfer assembly 56 can be connectable between the stabilizer 18 and the airframe 26 to provide a "secondary load path" between the stabilizer 18 and the airframe 26.

With additional reference to FIG. 6, the primary load transfer assembly 54 will be described in more detail. The primary load transfer assembly 54 can include a connector 58 for connecting the primary load transfer assembly 54 to the airframe 28. In the exemplary embodiment of FIGS. 5 and 6, the connector 58 is a spherical bearing, however, another suitable connector, for example, a gimbal, U-joint, etc., may be utilized. The connector 58 holds one end of the actuator 36 stationary relative to the airframe 28 while the actuator 36 is driven by a drive mechanism 60 to thereby control movement of the stabilizer 18.

The drive mechanism 60 may include one or more motors 62a and 62b and associated gearing 64. The motors 62a and 62b may be parallel motors, and may be electric, hydraulic, or other type motors. As shown in the embodiment of FIG. 5, the drive mechanism may be dual coaxial motors, and each motor 62a, 62b can be designed to provide the required performance while the other is turned off, thereby providing redundancy to the drive mechanism 60. Further, one practiced in the art could utilize any number of motors or could arrange the motors in a speed summing arrangement, or another arrangement. A rotary position sensing device 66, for example a resolver or another rotary sensing device, can be coupled to the motors 62a and 62b to measure motor rotation. The associated gearing 64 may be coupled to a clutch 68, for example, a slip clutch or other uncoupling means, which can be used to prevent overloads.

The gearing 64 and/or the clutch 68 can be coupled to a high-efficiency assembly 70 including a pair of no backs 72a and 73b to prevent back driving under external loads. The high-efficiency assembly also can include a screw member 72 and a nut member 74 whereby rotational movement of the screw member 72 results in linear motion of the nut member 74. Alternatively, with appropriate modifications the nut member can be rotated and the screw member moved linearly in response thereto. In either or any event, the members 72/74 can incorporate balls 76 and/or rollers there between.

The screw member 72 may be a conventional ball screw with skewed roller and ratchet plate or other configuration of no-back to hold position in absence of power or command. Alternatively, the screw member 72 may be a roller screw or another type screw.

The high-efficiency assembly 70 can be coupled to the clutch 68 by an arrangement of gears, indicated generally at 78. The arrangement of gears 78 may include a shaft 80 coupled to the clutch 68 at one end and to a gear 82 at the other end. Gear 82 can be meshed with gear 84 which can be attached to a collar 86 that can itself be attached to the screw 72. Gear 84 can be axially trapped between thrust bearings 88 and 90. Rotational movement of the gear 84 imparts rotational movement to the screw member 72. The screw member 72, collar 86 and gear 84 can be radially supported by bearings 92 and 94.

The nut member 74 and collar 86 may include respective stops 95 and 96 that are arranged so as to limit the longitudinal movement of the nut member 74 relative to the collar 86 to prevent overdriving. A position feedback sensor 97 (potentiometer, resolver, VDT, encoder or other) can be coupled or otherwise associated with the screw member 72 to measure travel of the screw member 72 and nut member 74 assembly. As described in more detail below, the sensor 97 can be used as part of a testing procedure to test the actuator.

The arrangement of gears 78 may be partially or completely contained within a subassembly housing 98, and a grease fitting 99 can be provided for lubricating the high-efficiency assembly 70.

The nut member 74 can be coupled to the stabilizer 18 via a link 100. The link 100 can include a connector 101 for connecting the link 100 to the stabilizer 18, and linear movement of the link 100 can result in corresponding movement of the stabilizer 18, which can cause the stabilizer 18 to pivot as described above with respect to FIGS. 1 and 2. Thus movement of the link 100, via the nut member 74, can control the position of the stabilizer 18, wherein the link 100 can be extended or retracted based upon the direction of rotation of the screw member 72 as commanded by the drive mechanism 60.

Figure 6:
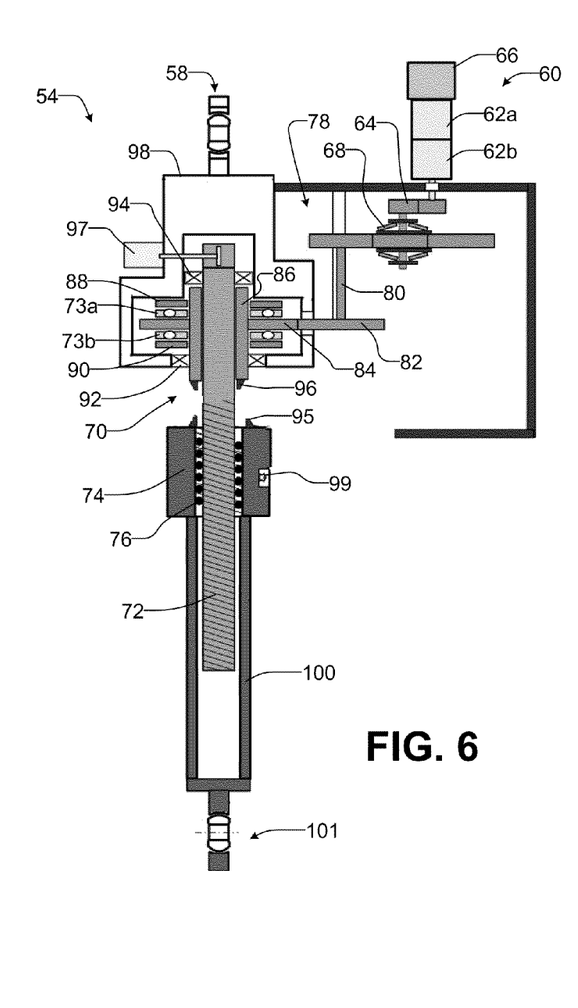
FIG. 6 is a schematic illustration showing a primary load transfer assembly in the actuator.

The connector 101 between the link 100 and the stabilizer 18 is illustrated as a spherical bearing in FIGS. 5 and 6, however, it will be appreciated that another connector may be used, such as a gimbal, a U-joint, etc. Additionally, while the connectors between the actuator 36 and the airframe 28 and the actuator 36 and the stabilizer 18 are both illustrated as being spherical bearings, it should be appreciated that the connectors need not be the same, and that a combination of connectors could be used.

Figure 7:
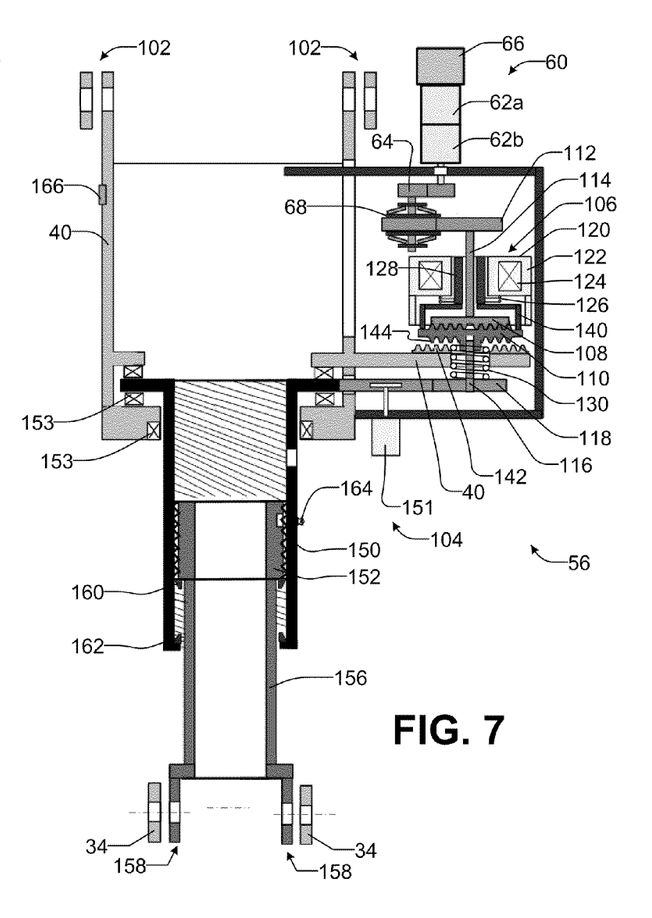
FIG. 7 is a schematic illustration showing the secondary load transfer assembly in the actuator.
Figures 8, 9, 10:
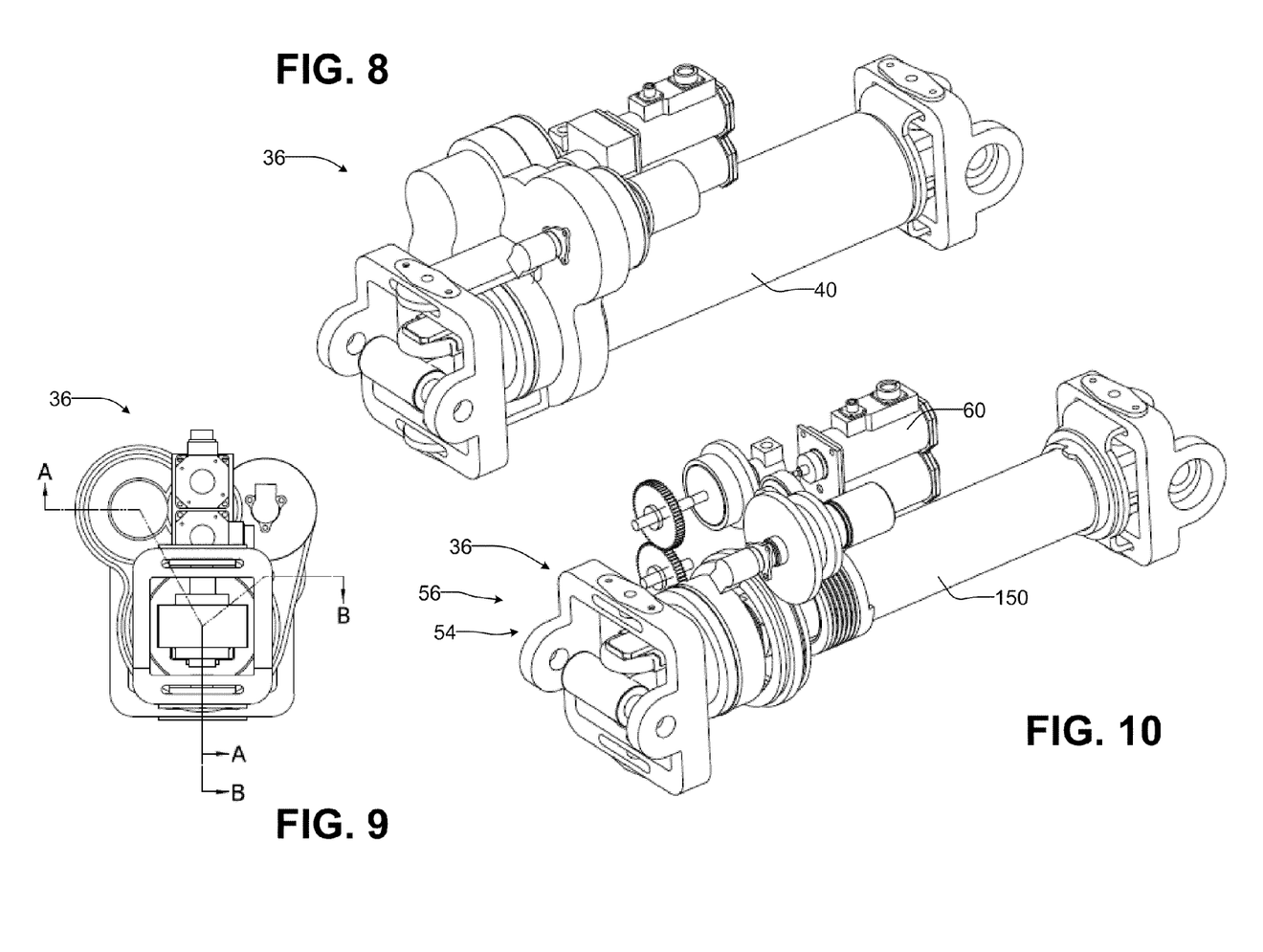
FIG. 8 is an isometric view of the actuator.
FIG. 9 is a bottom elevational view of the actuator.
FIG. 10 is an isometric view of the actuator with the housing removed.
Figure 11:
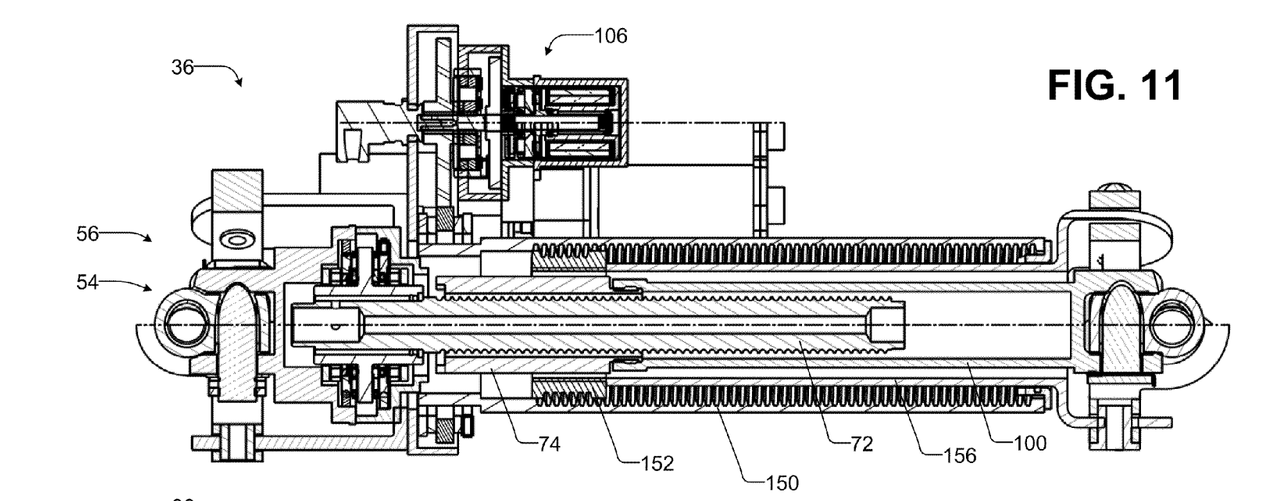
FIG. 11 is a sectional view of the actuator taken along lines A-A of FIG. 9.
Figure 12:
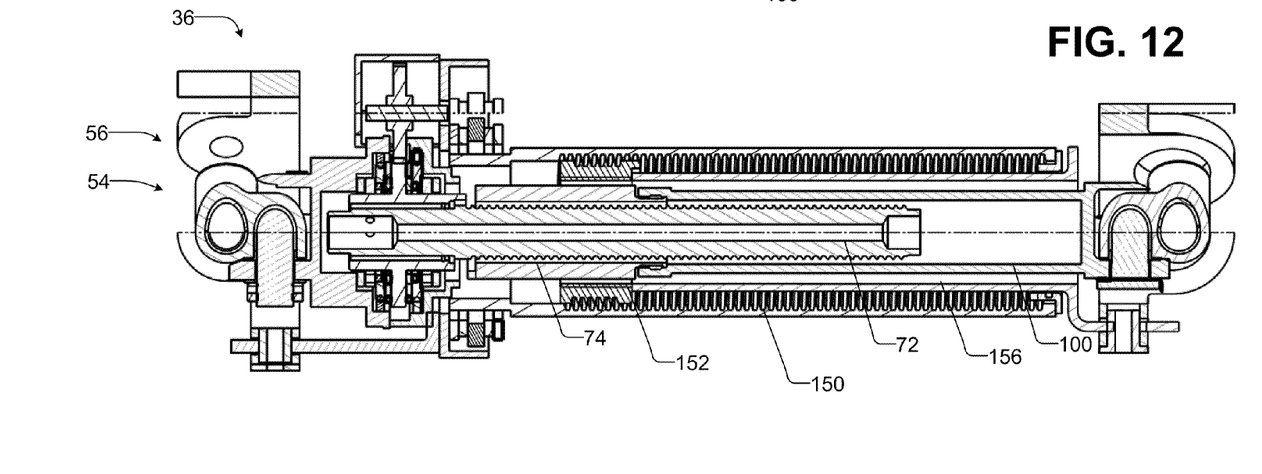
FIG. 12 is a sectional view of the actuator taken along lines B-B of FIG. 9.

Referring to FIGS. 5 and 7, the secondary load transfer assembly 56 will be described in more detail.

The secondary load transfer assembly 56 can include a connector 102 for connecting the secondary load transfer assembly 56 to the airframe 26. In the exemplary embodiment of FIGS. 5 and 7, the connector 102 is a gimbal configured to be coupled to corresponding mounting brackets 42c and 42d on rib 30. The actuator can be coupled to the airframe rib with any other suitable connector. Other suitable connectors such as spherical bearings, U-joints, etc., may be utilized.

The secondary load transfer assembly 56 can be driven by drive mechanism 60 and associated gearing 64 for driving a low-efficiency assembly 104. The secondary load transfer assembly 56 also can include a coupler 106 for coupling the low-efficiency assembly 104 to the drive mechanism 60. The coupler 106 can have a closed state in which the low-efficiency assembly 104 is coupled to the drive mechanism 60 and an open state in which the low-efficiency assembly 104 is decoupled (e.g., disengaged) from the drive mechanism 60.

The coupler 106 engages/disengages the drive mechanism 60 from the secondary load transfer assembly 56. The coupler 106 may be electrically activated, as shown in the illustrated embodiment of FIG. 5, hydraulically activated, or powered by another power source. The electrically actuated coupler 106 in the illustrated embodiment, can include an axially stationary (but rotatable) clutch member 108 and an axially movable rotatable clutch member 110. The clutch member 108 can be coupled to a gear 112 via shaft 114 and the clutch member 108 can be fixed for rotation with a drive shaft 114. The axially movable clutch member 110 can be fixed for rotation with a drive shaft 116 coupled to gear 118 for driving the low-efficiency assembly 104.

When the coupler 106 is in the closed state, clutch member 108 and the axially movable clutch member 110 can be engaged and rotational movement of the shaft 114 can be transferred to shaft 116 to drive the low-efficiency assembly 104. Thus, when the coupler 106 is in the closed state, the high-efficiency assembly 70 and the low-efficiency assembly 104 can both be driven by the drive mechanism 60. The high-efficiency assembly 70 and low-efficiency assembly 104 can be driven synchronously with one another with the coupler is closed.

When the coupler 106 is in the open state, the movable clutch member 110 can be disengaged from the axially fixed clutch member 108. For example, the clutch members 108 and 110 may be disengaged by sliding the axially movable clutch member 110 axially out of engagement with the clutch member 108 (e.g., downwards in the orientation illustrated in FIG. 7) so that the clutch members are separated by a space or gap between the clutch members 108 and 110. The coupler 106 may be biased to the open position so that the coupler automatically disengages the clutch members upon failure.

As shown in the illustrated embodiment of FIG. 5, the coupler 106 can be a solenoid-actuated device, as illustrated in the exemplary embodiment of FIG. 7. The solenoid-actuated device can be activated/deactivated to electrically switch the coupler 106 between the open and closed states by supplying power to the solenoid.

As shown in FIG. 7, the solenoid-actuated device can include a solenoid core 122 containing a coil 124, a resilient member 126 (e.g., a spring) and an armature 128 movable by the coil 124 relative to the core 122 to switch the coupler between the closed state and the open state. The armature 128 can extend around the axially fixed clutch 108 to contact the axially movable clutch member 110. When the solenoid coil 124 is de-energized the resilient member 126 can push armature 128 into axially movable clutch member 110 which in turn can compress resilient member (spring) 130 causing axially movable member 110 to move out of engagement with axially fixed clutch member 108 disengaging the low-efficiency assembly 104 from the drive assembly 60. When solenoid 124 is energized the magnetic flux across gap 140 can draw the armature 128 towards the core 122 and away from the axially movable clutch member 110 compressing the resilient member 126. Resilient member (spring) 130 then can push axially movable clutch member 110 into engagement with axially fixed clutch member 108 causing rotation of driveshaft 114 to be transmitted across clutch elements 108 and 110 to driveshaft 116.

The resilient member 126 can be located in gap 140 between a face of member 128 and the coupler housing 122 to bias the armature 110 to the open state. Resilient member 126 can provide greater force than resilient member 130 to assure that the coupler 106 is spring-loaded such that upon loss of holding power, the armature 128 is released to open the coupler 106 and disconnects clutch members 108 and 110.

During normal operation, the solenoid 120 can receive power from an outside source to maintain the coupler 106 in the closed state. With the coupler 106 in the closed state, the drive shaft 114 and drive shaft 116 can be coupled via clutch members 108 and 110 to thereby control movement of the low-efficiency assembly 104.

Upon detection of a failure, the coupler can be configured to release to the open state, thereby disengaging the low-efficiency assembly from the drive mechanism 60. For example, a failure of the no backs in the high-efficiency assembly 54, the coupler 106 can be de-energized. The armature 128 can be automatically released to the open state due to the bias of the resilient member 126. When the coupler 106 is in the open state, the armature 128 is extended from the coupler housing 122 and the axially movable clutch member 110 is disengaged from the clutch member 108, thereby preventing the low-efficiency assembly 104 from being driven by the drive mechanism 60. When it is disconnected from the drive mechanism 60, the low-efficiency assembly 104 can resist and/or inhibit movement of the stabilizer 18.

As mentioned above, other suitable couplers may be used to engage/disengage the low-efficiency assembly from the drive mechanism, and the electric coupler described and illustrated in FIG. 6 is but one suitable type of coupler that may be utilized. It should be noted that the clutch members 108 and 110 may be of either the positive engagement (tooth) type, as shown, or of the friction type.

The coupler 106 also may include an optional locking mechanism for grounding the low-efficiency assembly 104 to the actuator housing 40. For example, in the illustrated embodiment of FIG. 7, the axially movable clutch member 110 includes a locking feature 144 that further inhibits movement of the low-efficiency assembly 104 when engaged. The locking feature 144 of the axially movable clutch member 110 can engage a corresponding lock portion 142 of the actuator housing 40 to thereby ground the axially movable clutch member 110 to the actuator housing 40. As shown in FIG. 7, the locking feature 144 can be a set of teeth on the axially movable clutch member 110 that engage a corresponding set of teeth on lock portion 142 of the housing 40 when the coupler 106 is in the open state.

The low-efficiency assembly 104 can include a screw member 150 coupled to a threaded nut member 152. In the illustrated embodiment, the screw member 150 is an inverted screw having an Acme thread form, and the nut member 152 is an externally threaded nut. Due to the thread angle, the Acme thread form provides a lower efficiency than conventional thread forms and a greater radial load on the nut. The low-efficiency assembly may be non-backdrivable and/or irreversible.

Although described as being an Acme thread form, it will be appreciated that any low-efficiency screw/nut arrangement may be utilized. For example, the screw may be a high-efficiency screw with one or more high friction thrust flanges, no back devices and/or another component(s) that may decrease the efficiency of the screw such that the backdrive efficiency of the low-efficiency assembly 104 is sufficiently low so as to be non-backdrivable and/or irreversible and/or to make the low-efficiency assembly 104 less efficient than the high-efficiency assembly 70. It should be appreciated that the high-efficiency assembly and low-efficiency assembly may both be high efficiency arrangements, with the high-efficiency assembly having a greater efficiency relative to the low efficiency assembly.

A position feedback sensor 151 (potentiometer, resolver, VDT encoder or other) can be coupled or otherwise associated with the low-efficiency assembly 104 to measure travel of the screw member 150 and nut member 152 assembly. The low-efficiency assembly 104 also can include bearings 153 locating the screw member 150.

The inverted screw member 150 can form an internally threaded tube within which the nut member 152 travels. The inverted screw member can act as an enclosure protecting the primary ball screw 72 and nut 74 of the high-efficiency assembly 70 from the environment, for example, by shielding the primary ball screw and ball nut from exposure to dust, sand, debris, ice build-up and/or other conditions that may damage the primary ball screw and ball nut.

During normal operation, the high-efficiency assembly 70 and the low-efficiency assembly 104 can both be driven by the drive mechanism 60, e.g., the two dissimilar screw members can be mechanically synchronized in normal operation. Although the low-efficiency assembly 104 is driven by the drive mechanism 60 during normal operation, it may be configured so that it generally does not carry the load from the drive mechanism 60 to the stabilizer 18 by design. The low-efficiency assembly 104 can be generally unloaded in normal operation and can carry the load only after a structural failure of the primary load transfer assembly 54. This can be accomplished by configuring the screw members 150 and 152 such that the backlash in the low-efficiency assembly 104 is greater than the backlash in the high-efficiency assembly 70.

The backlash in the low-efficiency assembly 104 may be less than the backlash capable of inducing flutter in the horizontal stabilizer (or other control surface). For example, the second load transfer assembly 56 can have a backlash limited to a level that precludes flutter or instability of the horizontal stabilizer 18 after a structural failure in the first load transfer assembly 54. Thus this configuration of the screw members also may avoid or reduce possible flutter of the horizontal stabilizer (or other control surface) after a failure of the primary load transfer assembly 54.

The low-efficiency assembly 104 also may have a lower stiffness than the high-efficiency assembly 70 to reduce the possibility of load sharing with increased wear/backlash of components of the primary load transfer assembly 54, including, for example, the ball screw 72.

The nut member 152 of the low-efficiency assembly 104 can be connected to the stabilizer 18 via a link 156 and a connecting mechanism 158. Forces can be transferred between the stabilizer 18 and the low-efficiency assembly 104 via the connector 158 and the link 156. The connector 58 may be a gimbal as illustrated in FIGS. 5 and 7, or another connector, such as a spherical bearing, U-joint and the like. Additionally, the nut member 152 and the inverted screw member 150 may include respective stop members 160 and 162 arranged so as to limit the longitudinal movement of the nut member 152 relative to the screw member 150 to prevent overdriving of the nut member 152. A grease fitting 164 can be provided for lubricating the low-efficiency assembly 104.

At least a portion of the primary load transfer assembly 54 and the secondary load transfer assembly 56 can be concentric to one another. For example, as shown in the embodiment of FIG. 5 and the implementation illustrated in FIGS. 11 and 12, portions of the high-efficiency assembly 70 and the low-efficiency assembly 104 can be arranged concentrically e.g., such that portions of the nut members, screw members, gear members and/or bearing members are overlapping and not radially offset.

The secondary load transfer assembly 56 also can include one or more sensors 166 for sensing when load is carried in the secondary load path (e.g., load that is being carried by the secondary load transfer assembly 104). For example, the sensor 166 may be a force sensor, such as a strain gage, attached to the load transfer assembly 56 in the secondary load path at a position in which the load from the drive mechanism 60 and/or the airframe 26 to the stabilizer 18 can be sensed. In the embodiment of FIG. 5, the sensor 166 is coupled to the actuator housing 40, however, the sensor 166 can be attached at any position in the secondary load path and/or in the actuator 36 at a location in which loads in the load transfer assembly 56 can be detected.

The secondary load transfer assembly 56 may not share any structural element with the primary load transfer assembly 54. Both load transfer assemblies 54 and 56 have their own independent attachments on the airframe 26 and stabilizer 18. In such instances, a structural failure in one load transfer assembly will not necessarily inhibit the functionality of the other load transfer assembly. For example, if there is a structural failure of the threads of the screw member 72 in the primary load transfer assembly 54, the secondary load transfer assembly 56 can remain intact and coupled to the stabilizer 18 such that control is not lost when the primary screw member 72 fails. This can reduce the likelihood that a structural failure in one load transfer assembly will be catastrophic.

During normal operation, the actuator 36 can control movement of the stabilizer 18 through the primary load transfer assembly 52, however, the actuator 36 may, or may not, be designed to operate on the secondary load transfer assembly via the low-efficiency assembly 104 after the structural failure of the high-efficiency assembly 70. As mentioned above, the primary load transfer assembly 54 and secondary load transfer assembly 56 can be structurally separate from one another, thus when there is a structural failure of the primary load transfer assembly 54, the load from the drive mechanism 60 is carried by the secondary load transfer assembly 56, which has a lower efficiency than the primary load transfer assembly 54. This can cause an increased load in the secondary load transfer assembly 56 and also can cause loads in the actuator housing 40. The increased loads, which may be abnormal under typical operating conditions, can be detected by the force sensor 166, at which point the coupler can be opened to disconnect the secondary load transfer assembly 56 from the drive mechanism 60.

Additionally or alternatively, upon structural failure of the primary load transfer assembly 54, the forces from the drive mechanism 60 may be transferred to the stabilizer 18 via the secondary load transfer assembly 56. The drive mechanism 60 may not be capable of driving the low-efficiency assembly 104 due to the inefficiency of the secondary load transfer assembly 56 (e.g., due to the Acme thread form, the low-efficiency assembly 104 and/or another component) as compared to the primary load transfer assembly 54. The drive mechanism 60 may stall as a result of the increased inefficiency. The motor stall can be detected and the power to the actuator shut down. The loss of power can cause the coupler 106 to decouple the drive mechanism 60 from the low-efficiency assembly 104, for example, by releasing the coupler to the open state. The low-efficiency assembly 104 can remain coupled to the stabilizer 18 but disengaged from the drive mechanism 60. Because the assembly 104 is disconnected from the drive mechanism 60, the only forces acting on the low-efficiency assembly 104 are those from the stabilizer 18. The low-efficiency assembly 104 can resist back driving and therefore, it can inhibit movement of the stabilizer 18. In this manner, the stabilizer 18 can be immobilized in a fixed position rather than being driven by the airload to an extreme and/or catastrophic position. Having the stabilizer 18 in a fixed and flyable position, the pilot can compensate for the immobilized control surface, for example, with elevators and/or other control surfaces on the aircraft. The low-efficiency assembly 104 can therefore hold the stabilizer 18 at a last commanded position when a failure is detected (e.g., increased load sensed by the sensor 166 in the secondary load transfer assembly 56).

The coupler 106 also can provide a mechanism for testing the integrity of the primary and secondary load transfer assemblies 54 and 56. For example, the integrity of the load transfer assemblies 54 and 56 can be tested by maintenance personnel from the cockpit of the aircraft without the need for a physical inspection of the actuator. The coupler 106 therefore can simplify aircraft inspection and maintenance. During testing, the drive mechanism 60 can be configured to operate at a reduced current so as to avoid unnecessary wear and/or fatigue on the components of the actuator.

The actuator 36 can be tested for failure conditions in the first load transfer assembly 54 and/or the second load transfer assembly 56 while the aircraft is on the ground. For example, the actuator can be tested by driving the drive mechanism 60 with the coupler 106 in the closed state. When the actuator 36 is functioning properly, the commands sent to the actuator 36 will result in corresponding movement (e.g., a command to extend the actuator by driving the motor in a first direction will result in corresponding movement of the actuator) of the stabilizer 18.

The coupler 106 can be commanded to the open state to thereby disconnect the drive mechanism 60 from the low-efficiency assembly 104. The drive mechanism 60 can then be driven to move the high-efficiency assembly 70. The two assemblies are now coupled to one another via the stabilizer 18. Thus, movement of the high-efficiency assembly 70 may only be possible if the low-efficiency assembly 104 is back driven. The low-efficiency assembly 104 can resist movement of the stabilizer 18 if the actuator is operating properly. Movement of the high-efficiency assembly 70 can be sensed by the sensor 97 to determine if the low-efficiency assembly 104 is resisting movement of the stabilizer 18. Excess motion detected by the sensor 97 can indicate failure of the actuator or structure.

Additionally or alternatively, the forces acting in the secondary load transfer assembly 56 can be sensed by force sensor 166. The secondary load transfer assembly 56 should be loaded when the drive mechanism 60 is driven with the coupler 106 in the open state (e.g., the load from the drive mechanism 60 will be transferred to the secondary load transfer assembly 56 via the stabilizer 18 when the drive mechanism drives the assembly 70 to move the stabilizer 18). If forces are not sensed in the secondary load transfer assembly 56, then the sensors are faulty or the low-efficiency assembly 104 is not carrying load and, therefore, is not resisting movement of the stabilizer 18. This indicates a malfunction of the actuator and/or a failure of the secondary load transfer assembly 56.

The coupler 106 also can be used to measure the overall backlash of the actuator 36. As discussed above, the low-efficiency assembly 104 can resist movement of the driving assembly 70 when the coupler 106 is in the open state. This can cause the drive mechanism 60 to stall when it encounters resistance from the low-efficiency assembly 104. To measure the overall backlash of the actuator 36, the drive mechanism 60 can be driven in a first direction until the drive mechanism 60 stalls as a result of resistance from the low-efficiency assembly 104. The drive mechanism 60 can then be driven in the opposite direction to a second stall position. The number of revolutions of drive mechanism 60 between the first stall position and the second stall position can be measured by the sensor 66 in the drive mechanism 60. The total number of revolutions between the stall positions provides a measure of the overall backlash of the actuator 36, and this can be used to determine the overall wear of the actuator.

To avoid a trapping force between the high-efficiency assembly 70 and the low-efficiency assembly 104, the coupler 106 can be closed to reengage the drive train 116 of the low-efficiency assembly 104 at a mid-backlash position. For example, the mid-backlash position can be determined by dividing the total number of revolutions of the drive mechanism 60 between the two stall positions in half. The drive mechanism 60 can then be driven to the mid-backlash position before the coupler 106 is closed, thereby avoiding a trapping force between the two assemblies 70 and 104. The mid-backlash position may be, for example, a center portion of the backlash of the low-efficiency assembly 104 and/or of the high-efficiency assembly 70.

Figure 13:
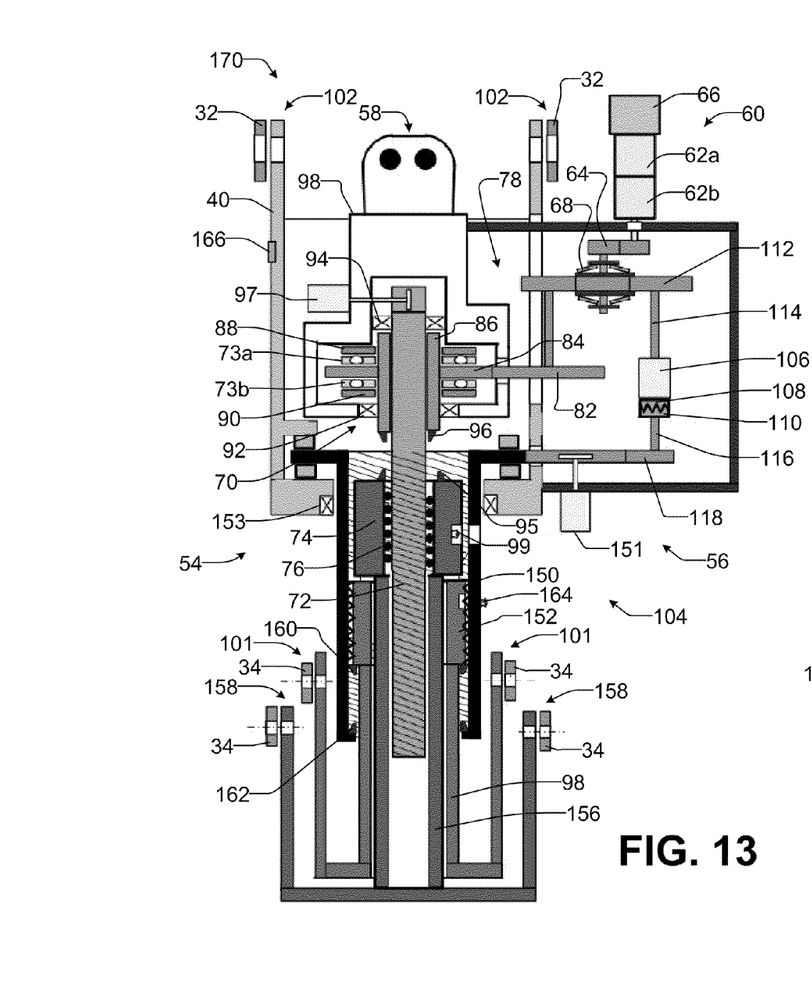
FIG. 13 is a schematic drawing of another embodiment of an actuator for a control surface.

Referring now to FIG. 13, an embodiment of an actuator 170 that does not include the optional lock mechanism described above with respect to FIG. 5 is shown. As shown in FIG. 13, the coupler 106 can be configured to directly couple/decouple the drive shafts 114 and 116 via clutch members 108 and 110. Another difference between the embodiment of FIG. 8 and the embodiment of FIG. 5 is the link members 98 and 156 connected to the respective nut members 74 and 152. In the embodiment of FIG. 13, the link members are generally U-shape links, which may be used to reduce the overall length of the actuator. Such a configuration can be useful in environments in which there is limited space for the installation of the actuator between the control surface and the airframe. The functionality of the actuator 170 of FIG. 8 can otherwise be the same as that of the actuator 36 described above with respect to FIG. 5.

Figure 14:
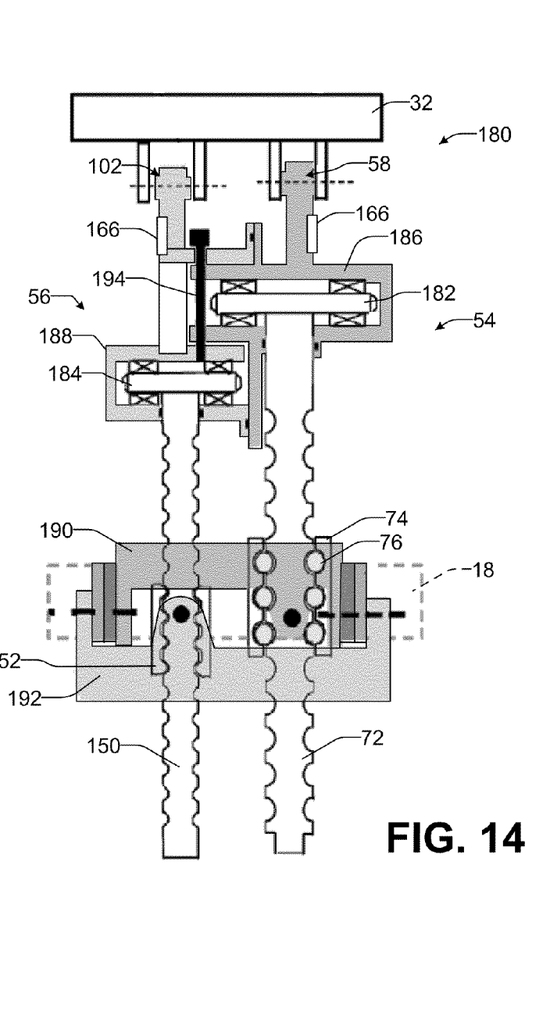
FIG. 14 is a schematic drawing of still another embodiment of an actuator for a control surface in which the primary load path and secondary load path are not disposed in a concentric relationship.

FIG. 14 illustrates another embodiment of an actuator 180, wherein the high-efficiency assembly 70 and the low-efficiency assembly 104 are not arranged concentric to one another, but rather are disposed in a parallel and laterally offset relationship (e.g., side-by-side). Such an arrangement may be useful, for example, where there is a space restriction on the distance between the airframe and the control surface. The functionality of the actuator 180 of FIG. 14 can be essentially the same as that of the actuator 36 of FIG. 5 with one difference being the arrangement of the screw members 72 and 150. Although not specifically illustrated, it will be appreciated that the embodiment of FIG. 14 may include a coupler that can be controlled to selectively engage/disengage the drive mechanism from the low-efficiency assembly 104 as described above with respect to FIG. 5.

The primary load transfer assembly 54 and secondary load transfer assembly 56 in the embodiment of FIG. 14 can be driven by a drive assembly which can be essentially the same as the drive mechanism and associated gearing described above with respect to FIG. 5, but adapted to the offset arrangement of the screw members. That is, gear 182 drives high-efficiency screw member 72, and gear 184 drives low-efficiency screw member 150. The screw members 72 and 150 can be rotatable to drive nut members 74 and 152, respectively. The gears 182 and 184 may be spur gears contained in respective gear boxes 186 and 188.

In this configuration, the stabilizer 18 can be attached to the actuator 180 by two independent and nested gimbals 190 and 192. Misalignments between the stabilizer 18 and the airframe 26 can be dealt with in various manners. In the embodiment of FIG. 14, the gear box 188 containing the gear 184 for driving the low-efficiency screw 150 can slide axially relative to the gear box 186 containing the gear 182 driving the high-efficiency screw 72. The gear boxes 184 and 186 can be engaged to one another via elongate member 194, which allows that gear boxes to slide axially relative to one another without disengaging the gears synchronizing the rotation of the two screw members.

The actuator described herein provides a number of benefits over known prior designs. For example, the ball screw actuator with a concentric and unloaded secondary load transfer assembly may be suitable for an automated test of its integrity. The actuator can provide a ball screw actuator with a mechanically-synchronized inverted Acme screw as the secondary load transfer assembly. The inverted Acme screw can provide an enclosure to protect the ball screw from the environment (sand, dust, ice build-up, etc.). The ball screw actuator can have a secondary path of lower stiffness as a means of reducing its loading with increasing wear of the screw in the primary load transfer assembly. The coupler in the synchronization path can provide a means to test the integrity of both load transfer assemblies and measure the combined backlash, thereby avoiding the need for physical inspection of the secondary load transfer assembly to identify any latent failures in the secondary load transfer assembly. The coupler can provide a means for holding position after a failure of the no back in the primary load transfer assembly. Additionally, the coupler can include a brake mechanism to provide a brake on the rotation of the secondary Acme screw to preclude or inhibit possible creep with high vibration level.

Although described primarily in the context of a horizontal stabilizer 18 attached to a tail portion of an aircraft, it will be appreciated that the actuator described herein can be used to control movement of other members or loads on other applications.

Although the actuator has been shown and described with respect to a certain embodiment, equivalent alterations and modifications should occur to others skilled in the art upon review of this specification and drawings. If an element (e.g., component, assembly, system, device, composition, method, process, step, means, etc.), has been described as performing a particular function or functions, this element corresponds to any functional equivalent (i.e., any element performing the same or equivalent function) thereof, regardless of whether it is structurally equivalent thereto. And while a particular feature may have been described with respect to less than all of embodiments, such feature can be combined with one or more other features of the other embodiments.

What is claimed is:

1. An actuator for actuating movement of a control surface relative to a structure, comprising:
   a first load transfer assembly comprising a first assembly, the first load transfer assembly connectable between a control surface and a structure, the first load transfer assembly providing a first load path from the control surface to the structure;
   a second load transfer assembly comprising a second assembly, the second load transfer assembly connectable between the control surface and the structure, the second load transfer assembly providing a second load path from the control surface to the structure, and wherein the second assembly is less efficient at transferring motion between the structure and the control surface than the first assembly;
   a drive mechanism for driving the first assembly and the second assembly; and
   a coupler disposed between the drive mechanism and the second assembly and having a closed state in which the drive mechanism is coupled to the first assembly and second assembly such that the first assembly and the second assembly are synchronously driven, and an open state in which the drive mechanism is decoupled from the second assembly so that second assembly can inhibit movement of the control surface.

2. The actuator of claim 1, wherein the first load path and the second load path are concentric with one another.

3. The actuator of claim 1, wherein the first load path and the second load path are parallel and laterally offset from one another.

4. The actuator of claim 1, wherein the coupler includes a lock mechanism engageable to a housing of the actuator when the coupler is in the open state, whereby movement of the second assembly is further inhibited when the lock mechanism is engaged to the housing.

5. The actuator of claim 4, further comprising a sensor for sensing a load in the second load path.

6. The actuator of claim 5, wherein the coupler is configured to move to the open state upon the detection of a load in the second load path.

7. The actuator of claim 1, wherein the second assembly holds the control surface at a last commanded position by opening the coupler when a failure is detected in the high-efficiency assembly.

8. The actuator of claim 1, wherein the coupler is an electrically or hydraulically operated coupler biased to the closed state and releasable to the open state upon detection of a failure event.

9. The actuator of claim 1, wherein the first assembly comprises a ball or roller screw and nut.

10. The actuator of claim 1, wherein the second assembly comprises an inverted Acme screw and an externally threaded nut.

11. The actuator of claim 1, wherein the second assembly is irreversible.

12. The actuator of claim 1, wherein the second assembly comprises an irreversible screw, or a screw with an irreversible mechanism including at least one of high friction thrust flanges and/or no-back devices.

13. The actuator of claim 1, wherein the first load transfer assembly includes a first connector for connection to the control surface and a second connector for connection to the structure; and
   wherein the second load transfer assembly includes a first connector for connection to the control surface and a second connector for connection to the structure, and
   wherein the high-efficiency assembly effects movement of the connecting members on the control surface relative to the connecting members on the structure.

14. The actuator of claim 1, wherein the second assembly has a backlash that is greater than a backlash of the first assembly, whereby load from the drive mechanism is carried primarily in the first load transfer assembly.

15. A method of using the actuator of claim 1, comprising:
   driving the drive mechanism with the coupler in the closed state to synchronously drive the high-efficiency assembly and the low-efficiency assembly;
   determining when a failure condition exists in the first load transfer assembly;
   opening the coupler upon detection of a failure condition to thereby decouple the low-efficiency assembly from the drive mechanism, and
   inhibiting movement of the control surface with the low-efficiency assembly.

16. The method of claim 15, wherein the determination of whether a failure condition exists includes sensing a load in the second load path.

17. The method of claim 15, further comprising engaging a locking mechanism to lock the low-efficiency assembly to the housing when the coupler is in the closed state.

18. A method for testing the actuator of claim 1, comprising:
   driving the drive mechanism when the coupler is in the closed state to non-synchronously drive the high-efficiency assembly and low-efficiency assembly; and
   determining if the low-efficiency assembly inhibits movement of the high-efficiency assembly, whereby the inhibition of movement by the low-efficiency assembly with the coupler in the open state indicates integrity of the first load transfer assembly and the second load transfer assembly.

19. The method of claim 18, further comprising:
   opening the coupler to thereby decouple the drive mechanism from the low-efficiency assembly;
   driving the drive mechanism to load the first load transfer assembly by driving the high-efficiency assembly, whereby the load is transferred from the first load transfer assembly to the second load transfer assembly through the control surface; and
   determining whether a potential failure condition exists in the second load transfer assembly.

20. The method of claim 19, wherein determining whether a potential failure condition exists in the second load transfer assembly comprises:
   sensing, with a sensor associated with the actuator that senses a load in the second load path, whether a load have been transferred to the load transfer assembly; and
   determining that a failure condition exists when the sensor senses that no load has been transferred to the second load transfer assembly from the load transfer assembly.

21. A method for measuring backlash in the actuator of claim 1, comprising:
   decoupling the low-efficiency assembly from the drive mechanism by opening the coupler;
   driving the drive mechanism in a first direction to drive the high-efficiency assembly in a corresponding first direction, whereby the low-efficiency assembly inhibits movement of the driven assembly in the first direction;
   detecting a first stall position of the drive mechanism caused by the low-efficiency mechanism inhibiting movement of the driven assembly;
   driving the drive mechanism in a second direction to drive the high-efficiency assembly in a corresponding second direction, whereby the low-efficiency assembly inhibits movement of the driven high-efficiency assembly in the second direction;

detecting a second stall position of the drive mechanism caused by the low-efficiency assembly inhibiting movement of the driven high-efficiency assembly;

determining the overall backlash of the actuator by comparing the first stall position and the second stall position.

22. The method of claim 21, wherein the drive mechanism is a motor, and the determination of the overall backlash of the actuator comprises measuring a number of revolutions of the motor between the first stall position and the second stall position.

23. The method of claim 22, further comprising driving the motor to a position between the first stall position and the second stall position prior to closing the coupler to engage the drive mechanism to the low-efficiency assembly at a mid-backlash position of the low-efficiency assembly backlash.

24. The actuator of claim 1, further comprising a first driven element and a second driven element, the first and second driven elements being driven by the drive mechanism and respectively driving, in parallel relationship to each other, the high-efficiency assembly and the low-efficiency assembly.

25. An actuator for actuating movement of a control surface relative to a structure, comprising:

a first load transfer assembly connectable between a control surface and a structure, the first load transfer assembly providing a first load path from the control surface to the structure;

a second load transfer assembly connectable between the control surface and the structure, the second load transfer assembly providing a second load path from the control surface to the structure, and wherein the second load transfer assembly is less efficient at transferring motion between the structure and the control surface than the first load transfer assembly;

a drive mechanism for driving the first load transfer assembly and the second load transfer assembly, wherein the drive mechanism is coupled to the first load transfer assembly and activation of the drive mechanism causes rotation of a first member of the first load transfer assembly, which causes translation of a second member of the first load transfer assembly causing a change in length of the first load transfer assembly and corresponding movement of the surface relative to the structure, and wherein the drive assembly is coupled to the second load transfer assembly and activation of the drive mechanism causes rotation of a first member of the second load transfer assembly which causes translation of a second member of the second load transfer assembly causing a change in length of the second load transfer assembly; and a coupler disposed between the drive mechanism and the second assembly and having a closed state in which the drive mechanism is coupled to the first load transfer assembly and the second load transfer assembly such that the first load transfer assembly and the second load transfer assembly are synchronously driven, and an open state in which the drive mechanism is decoupled from the second load transfer assembly so that second load transfer assembly can inhibit movement of the control surface.

26. An actuator for actuating movement of a control surface relative to a structure, comprising:

a first load transfer assembly connectable between a control surface and a structure, the first load transfer assembly providing a first load path from the control surface to the structure;

a second load transfer assembly connectable between the control surface and the structure, the second load transfer assembly providing a second load path from the control surface to the structure, and wherein the second load transfer assembly is less efficient at transferring motion between the structure and the control surface than the first load transfer assembly;

a drive mechanism having a single output shaft drivably coupled to a drive assembly having a first drive path transmitting rotational movement of the drive mechanism to the first load transfer assembly and a second drive path transmitting rotational movement of the drive mechanism to the second load transfer assembly; and wherein the drive assembly includes a coupler disposed as part of the second drive path between the drive mechanism and the second load transfer assembly and having a closed state in which the drive mechanism is coupled to the first load transfer assembly and the second load transfer assembly such that the first load transfer assembly and the second load transfer assembly are synchronously driven, and an open state in which the drive mechanism is decoupled from the second load transfer assembly so that second load transfer assembly can inhibit movement of the control surface.

* * * * *